Evaluation of E.P. Lubricants
at Ambient Temperature
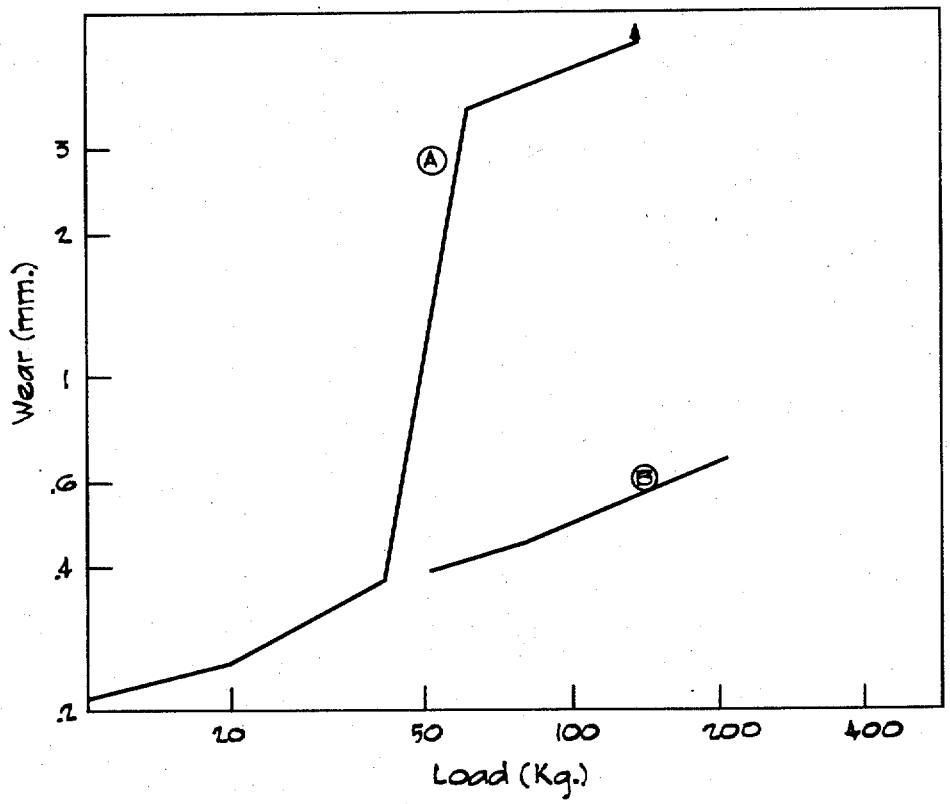
Fig. I
Inventors: Denham Harman
Roy E. Thorpe
By their Attorney: James Jedorovic Evaluation of E.P. Lubricants
at 130 °C
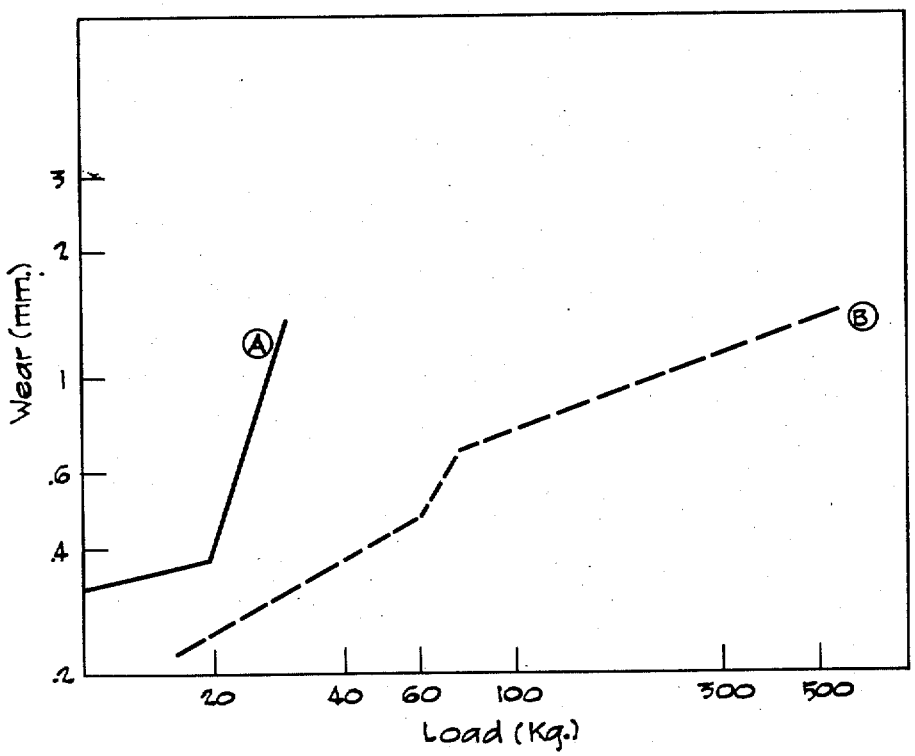
Fig. II
Inventors: Denham Harman
Roy E. Thorpe
By their Attorney: James Lodaravis United States Patent Office Re. 23,979

Reissued Apr. 12, 1955

23,979

LUBRICANT COMPOSITION CONTAINING DIALKYL TRIHALOALKANE PHOSPHONATE AS AN EXTREME PRESSURE AGENT

Denham Harman, Orinda, and Roy E. Thorpe, San Francisco, Calif., assignors to Shell Development Company, San Francisco, Calif., a corporation of Delaware Original No. 2,573,568, dated October 30, 1951, Serial No. 26,228, May 10, 1948. Application for reissue April 20, 1954, Serial No. 426,314

7 Claims. (Cl. 252—49.9)

Matter enclosed in heavy brackets [ ] appears in the original patent but forms no part of this reissue specification; matter printed in italics indicates the additions made by reissue.

This invention relates to a novel class of reaction products adapted to improve the properties of liquids and/or solids suitable for use as lubricants, coolants, rust and corrosion inhibiting compositions, coating compositions and the like. More particularly this invention pertains to lubricants, such as natural and synthetic lubricants, emulsions, aqueous solutions and organic and/or inorganic materials which can be adapted for lubricating purposes, by addition thereto of a novel multifunctional reaction product capable of imparting extreme pressure, anti-wear, anti-fouling properties, as well as acting as an inhibitor of oxidation and corrosion.

It is well known that various lubricants, whether doped or undoped, tend to oxidize and to form corrosive bodies and sludge, when used in modern engines and machines operating under ordinary conditions or at high speeds, elevated temperatures, heavy loads and/or other adverse conditions. Some of the deterioration products of lubricants formed during their use are hard carbonaceous materials which adhere to metal surfaces and cause scratching and scuffing of movable metal parts and sticking of valves and piston rings in engines. In addition, presently known lubricants are generally incapable of maintaining a continuous lubricating film between movable parts, resulting in gradual or rapid wearing away of metal parts. The damage thus caused required replacement of such parts or even the complete overhauling of engines and machines, resulting in expensive loss of production and time.

In the case of the highest quality non-corrosive, stable lubricating oils, which have been highly refined for specific uses, or synthetic lubricants developed for specific or special uses, has been observed that such oils or lubricants are generally highly susceptible to oxidation and deterioration, becoming progressively more corrosive in engines and machines even under ordinary operating conditions.

To improve the lubricating properties of oils and synthetic lubricants it has become the practice to blend with various lubricants, one, and in most cases, more than one, addition agents, which additives have the effect or property of inhibiting deterioration of lubricants, and impart to them certain beneficial properties. Thus, additives have been specifically designed which have the property of inhibiting corrosion of alloyed bearings such as copper-lead, cadmium-silver and the like, developed for automotive, diesel and aircraft engines. Acidic oxidation or decomposition components formed in lubricants during use readily attached these bearings but are inhibited or prevented from doing this by the formation of a corrosion protective film formed on the bearing surface with the aid of the additive. Additives have also been developed which possess the property of modifying the carbonaceous materials formed, by deterioration of lubricants, on piston rods, rings and valves, and other metal parts in internal combustion engines, automotive and truck engines, aviation engines, high speed diesel engines and the like. Such additives serve a very important function because, by modifying this carbonaceous material so that it can be removed easily, the tendency of engine parts to become stuck is inhibited so that ring-sticking, piston scuffing, scratching and wearing away of other engine parts and material reduction of engine efficiency, are prevented or materially inhibited.

Other additives have been developed for the purpose of acting as detergents in lubricants in order to assist in the removal of soot or sludge, varnish, lacquer formed from deterioration of the oil when subjected to high operating temperatures. Detergents due to their cleaning action prevent the build-up of these deleterious materials and assist in removing those formed. Anti-wear additives have the property of reducing friction of movable parts or different metals. Due to the function exerted or property imparted by such additives on lubricants, wear caused by direct frictional contact of metals can be greatly reduced. Also, additives have been developed to withstand extreme pressures, disperse impurities, solubilize certain additives and the like.

The development of numerous additives has been due to the fact that most, if not all additives are capable of functioning in substantially only one specific manner. Very few lubricant additives have the ability to improve a lubricant in more than just one respect. Thus, a good anti-oxidant might not be able to inhibit lacquer and varnish formation on piston rods or act as a detergent or corrosion inhibitor. In many cases it is found that an additive possesses very good properties in one respect, but is the cause of harmful formations and therefore detrimental as an additive in another respect. Therefore, other additives are frequently required to obtain a good stable lubricant. The combination of additives in lubricants wherein each additive exerts its influence without interfering with the function of other additives is a difficult matter to attain. In most cases additives co-react or interfere with each other. To prevent this, great care must be taken in selecting the additives, mixing them in specific proportions and continuously watching and replacing additives which have stopped functioning or have deteriorated.

Additives which are used in lubricants for industrial purposes such as in cutting, drawing, quenching, and rolling operations must impart to said lubricants film strength, corrosion inhibiting and detergent properties as well as aid the base lubricant to cool and lubricate the base metal or other surfaces under the most adverse conditions of lubrication and the like.

It is an object of this invention to improve the lubricating properties of various lubricating bases by the addition thereto of a minor amount of a multi-functional material. Another object of this invention is to add to compounded or doped lubricants a multi-functional material whereby a synergistic effect is produced, resulting in a product of accentuated and improved properties. Another object of this invention is to add to oleaginous materials, organic and inorganic lubricants, mineral lubricating oils, synthetic lubricants and the like, a multi-functional material so as to inhibit oxidation and corrosion and prevent the formation of sludge, varnish and lacquer in said lubricants even under adverse operating conditions. Still another object of this invention is to use in lubricating compositions, a multi-functional material which prevents ringsticking as well as the sticking of other engine parts due to deterioration of the lubricant. Also it is an object of this invention to use an oleaginous materials, e. g. in lubricating compositions, a multi-functional material which inhibits wear, scuffing, scratching and other damage to engine parts. Also it is an object of this invention to improve the lubricating and cooling properties of base materials adapted for use in cutting, quenching, drawing and rolling operations by addition to said base materials a multi-functional material of this invention. Furthermore, it is an object of this invention to provide novel multi-functional improving and enhancing additives for lubricating bases. Other objects of this invention will appear as the description proceeds.

To the accomplishment of the foregoing and related ends, this invention consists of features which will be hereinafter fully described, and particularly pointed out in the claims, the following description setting forth in detail certain embodiments of the invention, these being illustrative of but a few variations in which the principle of the invention may be employed.

Broadly stated, this invention is directed to the use, in various materials, of a reaction product obtained by reacting a polyhalogenated organic compound of the formula $R_4D$, where $R_4$ is a halogenated organic radical bonded to a halogen D, with a phosphorous-containing compound of the structures

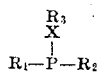

Formula I or

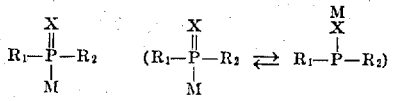

Formula II wherein M is a metal atom, X is oxygen, sulfur, selenium or tellurium, $R_3$ is an organic radical attached to X by a bond to a carbon atom, and $R_1$ and $R_2$ are organic radicals, carbon atoms of which are either bonded directly to the P atom or bonded to the P atom through an X atom. The organic radicals $R_1$, $R_2$ and $R_3$ may have substituent polar groups, such as OH, Cl, SH, $SO_3H$, $NH_2$, $NO_2$, etc.

The products of the reaction have the general structure

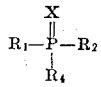

Formula III from which it is apparent that the radical $R_3$ or the metal M of the starting phosphorus-containing compounds have combined with the halogen D of the starting halogenated organic compound $R_4D$, and the halogenated radical $R_4$ has become bonded to phosphorus.

The resultant reaction product of the above reaction must contain at least one P—C group and at least one and preferably more than one halogen atom, not more than four and preferably less than two carbon atoms distant from the phosphorus atom. However, if there are halogens attached to the terminal carbon atom so as to form the C(DEF) group, wherein D, E and F are like or different halogens, the carbon chain may be of any length desired.

In the above formulas $R_1$ and $R_2$ may be the same or different, and are selected from the group consisting of alkyl, aryl, cyclo-alkyl, alkylaryl, alkylated cyclo-alkyl, cycloalkyated aryl, arylated cycloalkyl, alkoxyl, aroxyl and the like. Also specific illustrative radicals which are representative examples of the generic radicals mentioned are: methyl, ethyl, butyl, amyl, octyl, stearyl, allyl, oleyl; phenyl, xenyl, naphthyl, antracyl, cyclopentyl, cyclohexyl, cycloheptyl, cyclohexylethyl, cyclohexylamyl, cyclohexylbutyl; phenyl cyclohexyl, naphthylcyclohexyl; cyclohexylphenyl, cyclohexylnaphthyl; methyl cyclohexyl, ethyl-cyclohexyl, amyl-cyclohexyl, cetylcyclohexyl; methyl-cyclohexyl benzyl, cyclohexyl-cresyl, cetyl-phenyl cyclohexyl, methylcyclohexylamyl, methyl - cyclohexyl-lauryl; phenyl-cyclohexyl; cresyl, xylyl, dimethylphenyl, ethyl-phenyl, amyl-phenyl, cetyl-phenyl, ethyl naphthyl; methoxy phenyl; ethoxy phenyl, octoxy phenyl, dichlorohexoxy-phenyl, thiomethoxy phenyl, thioethyloxy phenyl, seleno methoxy phenyl, seleno ethyloxy phenyl, telluro methoxy phenyl, thiolauroxy phenyl, seleno lauroxy phenyl; acetyl-phenyl, lanoyl-phenyl, stearoyl-phenyl, stearoyl-ethyl, lauroxyl-ethyl; etc.

Specific phosphite esters which may be used to form reaction products of this invention may be any of the partial or full phosphite esters mentioned in the following U. S. patents: 2,084,270, 2,121,611, 2,188.943, 2,191,996, 2,230,543, 2,241,243 2,326,140, 2,365,291, 2,365,974, 2,372,244, and 2,432,095.

Among the most preferred phosphite esters may be: di and triethyl phosphite; di and tributyl phosphite; di and trioctyl phosphite; di and tricyclohexyl phosphite; mixed isoamyl phosphites, mixed n-butyl phosphites; di and trinaphthenyl phosphites; di and triphenyl phosphites; amyl phenoxy-ethyl phosphite; butyl phenyl phosphite; tricresyl phosphite; the di and trithio or seleno or telluro triorgano phosphites or their mixtures. Of these esters, di and triethyl phosphite; the di and trithiophosphite; the di and tributyl phosphite; the di and trithiophosphite; the di and triamyl phosphite; the di and trithiophosphite; the di and triphenyl phosphite; and the di and trithiophosphite, are particularly preferred.

When dialkyl phosphites are used, they must first be converted to the metal salt (Formula II) before reaction with the polyhalogenated organic compound $R_4D$.

Any of the above phosphorus-containing compounds may be reacted with a polyhalogenated organic compound such as are listed below so as to form an organic phosphorus compound having a P—C linkage, said compound having at least one and preferably more than one halogen atom, not more than four carbon atoms removed from the phosphorus atom, or if there is a C(DEF) wherein (D, E, and F are halogen atoms) group on the terminal carbon of the chain which attaches itself to the phosphorus atom, the halogens may be more than four carbon atoms removed from the phosphorus atom: carbon tetrachloride, carbon tetrabromide, hexachloroethane, trichloroethane, polyhalogenated fatty acids in which the halo radicals are preferably attached in the alpha or beta position to the carboxyl radical. Specific compounds are: trichloroacetic acid, alpha, alpha, beta, beta-teterachloropropionic acid, alpha, alpha, beta-trichlorobutyric acid, tribromoacetic acid, triiodacetic acid, trihalogenated [aldehydes ketones and] ethers [such as trichlorobutanone, trichloromethyl isobutyl ketone] and the like can also be used.

The reaction between the phosphorus compound and the trihalogenated non-aromatic compounds so as to effect a P—C linkage, may be carried out by admixing the two materials in such proportion so that there is generally an excess of the halogen compound present and refluxing. The desired reaction product may be removed from the mixture by distilling under reduced pressure.

EXAMPLE I

A desired reaction product of this invention was prepared by refluxing about 50 gm. of triethyl phosphite with about 250 cc. of dry carbon tetrachloride. A colorless solution was formed which was distilled under reduced pressure, to yield a colorless mobile liquid, diethyl trichloromethane phosphonate, having a boiling point of around about 121° C. at 11 mm. pressure and a $n_D^{20}$ of 1.4628. The reaction proceeded as follows:

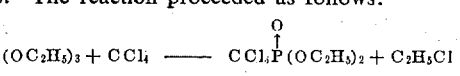

EXAMPLE II

Another reaction product of this invention was prepared by refluxing for about 24 hours about 50 gms. of tributyl phosphite with about 150 gms. of dry carbon tetrachloride. A colorless solution formed which was distilled under reduced pressure to yield a product, di-n-butyl trichloromethane phosphonate, having a boiling point of between about 150° C. and about 155° C. at 5 mm. pressure and a $n_D^{20}$ of 1.4490. The reaction proceeded as follows:

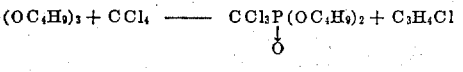

Other reaction products of this invention which can be used to improve the lubricating properties of various materials are:

Reaction product of diethyl sodium phosphite with carbon tetrachloride.

Reaction product of diethyl sodium phosphite with trichloroacetic acid.

Reaction product of tributyl phosphite with trichloracetic acid.

Reaction product of tricyclohexyl phosphite with carbon tetrachloride.

Reaction product of tricyclohexyl phosphite with trichloroacetic acid.

Reaction product of amyl phenoxyethyl lithium phosphite with carbon tetrachloride.

Reaction product of tricresyl phosphite with carbon tetrachloride.

Reaction product of triethyl trithiophosphite with carbon tetrochloride.

Reaction product of triethyl trithiophosphite with trichloroacetic acid.

Reaction product of tricyclohexyl trithiophosphite with carbon tetrachloride.

Reaction product of triethyl mono-selenophosphite with carbon tetrachloride.
Reaction product of tricresyl dithiophosphite with hexachloroethane.
Reaction product of sodium diethyl dithiophosphite with bromoform.
Reaction product of triamyl monothiophosphite with carbon tetrabromide.
Reaction product of triallyl phosphite with carbon tetrachloride.

The vehicles to which reaction products of this invention may be added for purposes of improving the lubricating qualities of said vehicles or for purposes of producing corrosion-protective compositions and the like may be divided into several groups.

The vehicles should preferably be substantially neutral, although they may be weakly acidic or basic, preferably having dissociation constants not above about $10^{-6}$. Both polar and non-polar vehicles may be employed. Among the former are water, alcohols such as methyl, ethyl, propyl, isopropyl, butyl, amyl, hexyl, cyclohexyl, heptyl, methyl, cyclohexyl, octyl, decyl, lauryl myristyl, cetyl, stearyl, oleyl, allyl, benzyl, etc. alcohols; polyhydric alcohols such as ethylene glycol, propylene glycol, butylene glycol, cetene glycol, glycerol, methyl glycerol, etc.; phenols and various alkyl phenols and thiophenols; ketones such as acetone, methyl ethyl ketone, diethyl ketone, methyl propyl ketone, methyl butyl ketone, dipropyl ketone, cyclohexanone, and higher ketones; keto alcohols; ethers such as diethyl ether, diisopropyl ether, diethylene dioxide, beta-beta-dichlorodiethyl ether, diphenyl oxide, chlorinated diphenyl oxide, diethylene glycol, triethylene glycol; neutral esters of carboxylic and other acids such as ethyl, propyl, butyl, amyl, octyl, stearyl, oleyl, phenyl, cresyl and higher acetates, propionates, butyrates, lactates, laurates, myristates, palmitates, stearates, oleates, ricinoleates, phthalates, salicylates, carbonates; natural waxes such as carnauba wax, candelilla wax, Japan wax, jojoba oil, sperm oil; fats such as tallow, lard oil, olive oil, cottonseed oil, perilla oil, linseed oil, tung oil, soya bean oil, flexseed oil, castor oil, etc.; as well as fractions and derivatives thereof.

Vehicles of little or no polarity comprise hydrocarbons such as liquid butanes, pentanes, hexanes, heptanes, octanes, octenes, benzene, toluene, xylene, cumene, indene, hydrindene, alkyl naphthalenes, gasoline, kerosene, fuel oil, gas oil, turbine oil, motor oil, mineral spirits, aromatic solvents, lubricating oils (which may be soap thickened to form greases), petrolatum, paraffin waxes, albino asphalts, etc. Generally when petroleum oils are used it is preferable that they be purified by solvent treatment so as to remove foreign matter.

Also synthetic oils may be used as the vehicles such as polymerized olefins, copolymers of alkylene glycols and alkylene oxides; organic esters, e. g. 2-ethyl hexyl sebacate, allyl laurate, and polymers thereof; dioctyl phthalate, trioctyl phosphate, polymeric tetrahydrofuran, polyalkyl silicon polymers, and the like. Mixtures of synthetic and natural lubricants and oils can be used. In addition resinous materials such as petroleum resins, natural resins as rosin, resins formed by polymerization of drying fatty oils, phenol-formaldehyde resins, glyptal-type resins formed by esterification of polyhydric alcohols with polycarboxylic acids can be used.

Still another class of vehicles to which condensation products of this invention can be added are water-in-oil and oil-in-water emulsions suitable for various uses such as lubricating, cooling, rust inhibiting, and the like.

The amount of additive of this invention which can be used depends upon the vehicle to which it is added and the intended purpose to which the composition is to be subjected to. Generally, the additive can be used in amounts varying from 0.01% to 20% and higher, preferably 0.1 to 10%.

Compositions of this invention were evaluated as extreme pressure agents by use of the Four-ball Extreme Pressure Lubricating Tester similar in principle to the Boerlage apparatus described in the magazine, Engineering, volume 136, July 13, 1933. This apparatus comprises four steel balls arranged in a pyramid formation. The top ball is rotated by spindles against the three bottom balls which are clamped in a stationary ball holder. The balls are immersed in the composition to be tested. Tests were run under conditions indicated in the following table and compared with other outstanding extreme pressure compounds.

FOUR-BALL E. P. LUBRICANT TESTER ON ADDITIVES IN SAE 90 OIL

[Fixed Conditions: One minute tests at 1500 R. P. M. steel on steel.]

| | Additive | Percent | | | Seizure load in Kg. | |
|---|---|---|---|---|---|---|
| | | P | S | Cl | Ambient | 130° C. |
| (1) | None | ------ | ------ | ------ | 45–50 | 20–25 |
| (2) | $P_2O_5$ treated castor oil | 0.2 | ------ | ------ | 50–60 | 30–40 |
| (3) | $P_2S_5$-isophorone bottoms reaction product | 0.06 | 0.2 | ------ | 60–80 | 40–60 |
| (4) | $P_2S_5$ treated sulfurized fatty oil | 0.03 | 1.53 | ------ | 75–80 | 55–60 |
| (5) | Dibutyl octanephosphonate | 0.2 | ------ | ------ | 70–80 | ---------- |
| (6) | $CCl_4$-triethylphosphite reaction product | 0.24 | ------ | 0.84 | 160–180 | 90–100 |
| (7) | $CCl_4$-tributylphosphite reaction product. | 0.20 | ------ | 0.68 | 110–120 | 90–100 |
| (8) | Diethyl 1,1,3, trichlorononanephosphonate | 0.02 | ------ | 0.68 | 110–120 | ---------- |
| (9) | Dibutyl monochloro propanephosphonate | 0.21 | ------ | 0.24 | 130–140 | 90–100 |

The above Four-ball test was repeated in order to observe the wear effects of 2% of $CCl_4$-triethyl phosphite reaction product (curve B) has on a SAE 90 gear oil. The results are shown in Figures I and II and compared against an undoped oil (curve A). The wear (mm.) is plotted against load (kg.) on a log-log scale from non-seizing conditions to welding.

Reaction products of this invention are equally effective as extreme pressure agents in synthetic lubricants. Thus, to a synthetic base comprising di(2-ethyl hexyl) sebacate containing approximately 15% of a thickening agent (a polymeric ester of acrylic acid), approximately 1% of various types of well known extreme pressure agents were added, and the compositions tested in the Four-ball E. P. machine and compared with compositions of this invention which consisted of the same synthetic base as noted above containing about 1% of $CCl_4$-tributyl phosphite reaction product of this invention. The results are tabulated below.

FOUR-BALL E. P. LUBRICANT TESTER ON ADDITIVES IN SYNTHETIC LUBRICANT (DI(2-ETHYL HEXYL)SEBACATE PLUS 15% OF A POLYMERIC ESTER OF ACRYLIC ACID)

[Fixed Conditions: One minute tests at 1500 R. P. M. steel on steel a ambient temperature.]

| | Additive | Load Carrying Capacity (Kg.) |
|---|---|---|
| (1) | $CCl_4$-tributyl phosphite reaction product | 110–120 |
| (2) | Di-2-ethyl hexyl B,B′ thio dibutyrate | 40–50 |
| (3) | Hexachlorobutadiene | 40–50 |
| (4) | Sulfurized sperm oil | 40–50 |
| (5) | None | 40–50 |

Lubricants of this invention were also tested (and compared with commercial products) in a gear lubricating testing machine in order to determine their effectiveness as hypoid gear lubricants. The gear lubricant testing machine used for carrying out the tests consists essentially of two parallel shafts with four geometrically similar gears affixed to their ends. Each pair of gears is placed in a gear box which also contains the ball-bearing supporting the shafts. The gear and bearing compartments are separated by oil-tight seals. To one of the shafts a loading couple is connected at one end and a torque applied at the other end. By applying a torque on this shaft the other shaft is placed under torsion. The resistance of gears to scoring due to the effectiveness of a lubricant was conducted as follows: A test gear was broken in and then subjected to increased loads for 10 minutes at each load in the presence of a test lubricant and the gear teeth examined for scoring after each increase in load. The results of the scoring tests using different lubricants are given below:

GEAR LUBRICANT TESTING MACHINE USING SAE 90 HYDROCARBON BASE OIL

| | Additive | Scoring on Addendum Surface | Scoring on Dedendum Surface |
|---|---|---|---|
| | | Pounds | Pounds |
| (1) | 2% $CCl_4$-triethyl phosphite reaction product | 85 | 40 |
| (2) | Commercial gear lubricant containing 3.08% Sulfur, 1.14% chlorine and 1.62% lead | 60 | 30 |

Reaction products of this invention can be combined with other additives such as blooming agents, pour point depressors and/or viscosity improvers, antifoaming agents and the like. Among the specific additives for lubricating purposes, which can be used are oil-soluble detergents which include oil-soluble salts of various bases with detergent forming acids. Such bases include metal as well as organic bases. Metallic bases include those of alkali metals, Ca, Mg, Cu, Sr, Ba, Zn, Cd, Al, Sn, Pb, Cr, Mn, Fe, Ni, Co, etc. Organic bases include various nitrogen bases as primary, secondary, tertiary and quaternary amines.

Examples of detergent forming acids are the various fatty acids of, say, 10 to 30 carbon atoms, wool fat acids, paraffin wax acids (produced by oxidation of paraffin wax) chlorinated fatty acids, aromatic hydroxy fatty acids, paraffin wax benzoic acids, various alkyl salicylic acids, phthalic acid monoesters, aromatic keto acids, aromatic ether acids, diphenols as di- (alkylphenol) sulfides and disulfides, methylene bis-alkyl phenols; sulfonic acids such as may be produced by treatment of alkyl aryl hydrocarbons or high boiling petroleum oils with sulfuric acid; sulfuric acid mono-esters; phosphoric, arsonic and antimony acid mono and diesters, including the corresponding thio phosphoric and arsonic acids and the like.

Additional detergents are the alkaline earth phosphate diesters, including the thiophosphate diester; the alkaline earth diphenolates, specifically the calcium and barium salts of diphenol mono and polysulfides.

Non-metallic detergents include compounds such as the phosphatides such as lecithin and cephlin, certain fatty oils as rapeseed oils voltolized fatty or mineral oils and the like.

An excellent metallic detergent for the present purpose is the calcium salt of oil-soluble petroleum sulfonic acids. This may be present advantageously in the amount of about 0.025% to 0.2% sulfate ash. Also alkaline metal salts of alkyl phenol-aldehyde condensation reaction products are excellent detergents.

Antioxidants comprise several types, for example, alkyl phenols such as 2,4,6-trimethyl phenol, pentamethyl-phenol, 2,4-dimethyl-6-tertiarybutyl phenol, 2,4-dimethyl-6-octyl phenol, 2,6-ditertiary-butyl-4-methylphenol, 2,4,6-tritertiary-butyl phenol and the like; amino phenols as benzyl amino phenols; amines such as dibutylphenylene diamine, diphenyl amine, phenyl beta-naphthylamine, phenyl-alpha-napththylamine, dinaphthylamine.

Corrosion inhibitors or anti-rusting compounds may also be present, such as dicarboxylic acids of 16 or more carbon atoms; alkali metal and alkaline earth salts of sulfonic acids and fatty acids, organic compounds containing an acidic radical in close proximity to a nitrile, nitro or nitroso group (e. g. alpha cyano stearic acid).

Additional ingredients may comprise oil-soluble urea or thiourea derivatives, e. g. urethanes, allophanates, carbazides, carbazones, etc.; polyisobutylene polymers, unsaturated polymerized esters of fatty acids and monohydric alcohols and other high molecular weight oil-soluble compounds.

Depending upon the additional additive used and conditions under which it is used, the amount of additive used may vary from 0.01 to 2% or higher. However, substantial improvement is obtained by using amounts ranging from 0.1 to 0.5% in combination with reaction products of this invention.

We claim as our invention:

1. A composition of matter comprising a major amount of a neutral liquid medium and a minor amount, sufficient to impart extreme pressure properties to said neutral liquid medium, of a dialkyl trihaloalkane phosphonate.

2. A composition of matter comprising a major amount of a mineral oil and a minor amount, sufficient to impart extreme pressure properties to said mineral oil, of diethyl trichloromethane phosphonate.

3. A composition of matter comprising a major amount of an organic ester of a carboxylic acid and a minor amount, sufficient to impart extreme pressure properties to said organic ester of a carboxylic acid, of diethyl trichloromethane phosphonate.

4. A composition of matter comprising a major amount of a mineral oil and a minor amount, sufficient to impart extreme pressure properties to said mineral oil, of dibutyl trichloromethane phosphonate.

5. A composition of matter comprising a major amount of an organic ester of a carboxylic acid and a minor amount, sufficient to impart extreme pressure properties to said organic ester of a carboxylic acid, of dibutyl trichloromethane phosphonate.

6. A composition of matter comprising a major amount of a neutral liquid medium and a minor amount, sufficient to impart extreme pressure properties to said neutral liquid medium of diethyl trichloromethane phosphonate.

7. A composition of matter comprising a major amount of a neutral liquid medium and a minor amount, sufficient to impart extreme pressure properties to said neutral liquid medium of dibutyl trichloromethane phosphonate.

References Cited in the file of this patent or the original patent

UNITED STATES PATENTS

| | | |
|---|---|---|
| 2,138,385 | Butz | Dec. 6, 1938 |
| 2,174,019 | Sullivan | Sept. 26, 1939 |
| 2,392,468 | Engelke | Jan. 8, 1946 |
| 2,436,141 | Goebel | Feb. 17, 1948 |

OTHER REFERENCES

Kosolapoff, "Reaction Between Triethyl Phosphite and Trimethylene Bromide," J. A. C. S., vol. 66, pages 1511–1512.